United States Patent
Moreno et al.

(10) Patent No.: US 10,982,754 B2
(45) Date of Patent: Apr. 20, 2021

(54) VEHICLE GEAR SHIFT MODULE

(71) Applicant: Ficosa International (Taicang) Co. Ltd., Taicang (CN)

(72) Inventors: Javier Moreno, Barcelona (ES); Zhongxi Sun, Taicang (CN)

(73) Assignee: FICOSA INTERNATIONAL (TAICANG) CO. LTD., Taicang (CN)

(*) Notice: Subject to any disclaimer, the term of this patent is extended or adjusted under 35 U.S.C. 154(b) by 169 days.

(21) Appl. No.: 15/959,784

(22) Filed: Apr. 23, 2018

(65) Prior Publication Data

US 2019/0323599 A1    Oct. 24, 2019

(51) Int. Cl.
| F16H 59/12 | (2006.01) |
| F16H 59/02 | (2006.01) |
| F16H 59/04 | (2006.01) |

(52) U.S. Cl.
CPC ......... *F16H 59/12* (2013.01); *F16H 59/0204* (2013.01); *F16H 59/044* (2013.01)

(58) Field of Classification Search
CPC .... F16H 59/12; F16H 59/044; F16H 59/0204; F16H 59/10; F16H 61/18; F16H 61/24; F16H 19/04; F16H 59/02; F16H 2059/708; F16H 59/0217; F16H 59/0278; F16H 2059/0243; F16H 2059/083; B60K 20/04; G05G 1/04; G05G 1/06; G05G 1/10; Y10T 74/2003; Y10T 74/20396; B60Q 1/1476; H01H 25/06; H01H 25/065; H01H 9/06; H01H 13/02; H01H 25/00
USPC ...................................................... 74/473.3
See application file for complete search history.

(56) References Cited

U.S. PATENT DOCUMENTS

| 4,849,587 | A * | 7/1989 | Bacon ............... H01H 9/0214 200/61.85 |
| 5,854,458 | A * | 12/1998 | Ramamurthy ....... B60Q 1/1469 200/61.54 |
| 5,905,237 | A * | 5/1999 | Hayakawa ........... B60Q 1/1476 200/336 |
| 6,145,401 | A * | 11/2000 | Brush ..................... F16H 59/02 74/473.12 |
| 6,404,187 | B1 * | 6/2002 | Ruckert ............ F16H 59/0217 324/207.2 |
| 7,238,899 | B2 * | 7/2007 | Sugino ................ B60Q 1/1476 200/61.54 |

(Continued)

FOREIGN PATENT DOCUMENTS

| DE | 10025357 A1 | 11/2001 |
| DE | 10131219 C1 * | 3/2003 |

(Continued)

OTHER PUBLICATIONS

Define coiled spring—Google Search Dec. 2, 2019 (Year: 2019).*

(Continued)

*Primary Examiner* — Vinh Luong
(74) *Attorney, Agent, or Firm* — Cantor Colburn LLP

(57) ABSTRACT

A preassembled gear shift module is adapted to be connected to a substructure. The preassembled gear shift module includes a cover assembly, a circuit board, and a function button. The circuit board is attached to the cover assembly, and includes a switch. The function button is exposed through the cover assembly, and is operably connected to the switch.

10 Claims, 7 Drawing Sheets

(56) References Cited

U.S. PATENT DOCUMENTS

| | | | |
|---|---|---|---|
| 2004/0095778 A1* | 5/2004 | Zynda | F16H 59/0278 362/487 |
| 2005/0262819 A1* | 12/2005 | Weber | A01D 69/02 56/10.8 |
| 2006/0219535 A1* | 10/2006 | Mullard | H01H 25/06 200/61.54 |
| 2008/0000314 A1* | 1/2008 | Reppuhn | F16H 59/10 74/473.21 |
| 2008/0185278 A1* | 8/2008 | Kikuchi | B60Q 1/1476 200/341 |
| 2009/0301852 A1* | 12/2009 | Keist | B60K 37/06 200/341 |
| 2011/0277578 A1 | 11/2011 | McGuire et al. | |
| 2012/0000311 A1* | 1/2012 | Shioji | B60K 20/04 74/473.3 |
| 2013/0206564 A1* | 8/2013 | Kosaka | H01H 19/14 200/5 A |
| 2016/0178051 A1* | 6/2016 | Hwang | F16H 59/105 74/473.23 |

FOREIGN PATENT DOCUMENTS

| | | | |
|---|---|---|---|
| DE | 102006038465 A1 | | 4/2007 |
| EP | 0160905 | * | 11/1985 |
| EP | 3561835 A1 | * | 10/2019 |
| JP | 2012011858 A1 | | 1/2012 |
| KR | 20050017889 A | * | 2/2005 |
| KR | 100628626 B1 | * | 9/2006 |
| WO | WO 2013002101 A1 | * | 3/2013 |
| WO | 20130164678 A1 | | 11/2013 |

OTHER PUBLICATIONS

European Search Opinion of EP Appl. No. 19170679.5, dated Jul. 11, 2019 (Year: 2019).*
Define attached—Google Search, Jun. 7, 2020 (Year: 2020).*
Define printed circuit board switches—Google Search, Jun. 7, 2020 (Year: 2020).*
Define light guide—Google Search, Jun. 7, 2020 (Year: 2020).*
PCB Membrane Switches, nelson-miller.com., 2018 (Year: 2018).*

* cited by examiner

VEHICLE GEAR SHIFT MODULE

BACKGROUND

The present disclosure relates to a vehicle gear shift system, and more particularly, to a modular vehicle gear shift.

Traditional gear shifts often function to at least place a vehicle drive train in park, reverse, neutral, and drive. For some gear shifts, a button or lever carried by a shift lever, and/or knob of the shift lever, must first be actuated before moving the shift lever into a different position (i.e., park, reverse, neutral, and drive), or also changing the gear position to another position, or even to a predetermined position, such as a park position. Traditional gear shifts may further carry many other design features, such as illumination features, and some form of position indication in, for example, the gear shift lever or the knob. Such gear shifts may include a multitude of separate components with many moving in relationship to one-another.

Improvements in such complex gear shifts is desirable to, for example, reduce the number of components, reduce manufacturing costs, optimize assembly, reduce tolerance concerns and/or undesirable free-play, and improve robustness and reliability.

SUMMARY

In one exemplary, non-limiting, embodiment of the present disclosure, a preassembled gear shift module is adapted to connect to a substructure. The preassembled gear shift module includes a cover assembly, a circuit board, and a function button. The circuit board attaches to the cover assembly, and includes a switch. The function button is exposed through the cover assembly, and is operably connected to the switch.

In another, non-limiting, embodiment, a gear shift module includes a cover assembly, an electric switch, a shift button, and a linkage. The switch is engaged to the cover assembly. The shift button is exposed through, and slideably supported by, the cover assembly. In operation, the shift button is adapted to move along a linear direction between an unpressed position and a pressed position. The linkage is pivotally connected to the cover assembly and operably extends between the shift button and the switch. The shift button includes a resiliently flexible member in direct contact with the linkage for alleviating lost motion between the shift button and the switch.

The foregoing features and elements may be combined in various combinations without exclusivity, unless expressly indicated otherwise. These features and elements, as well as the operation thereof, will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
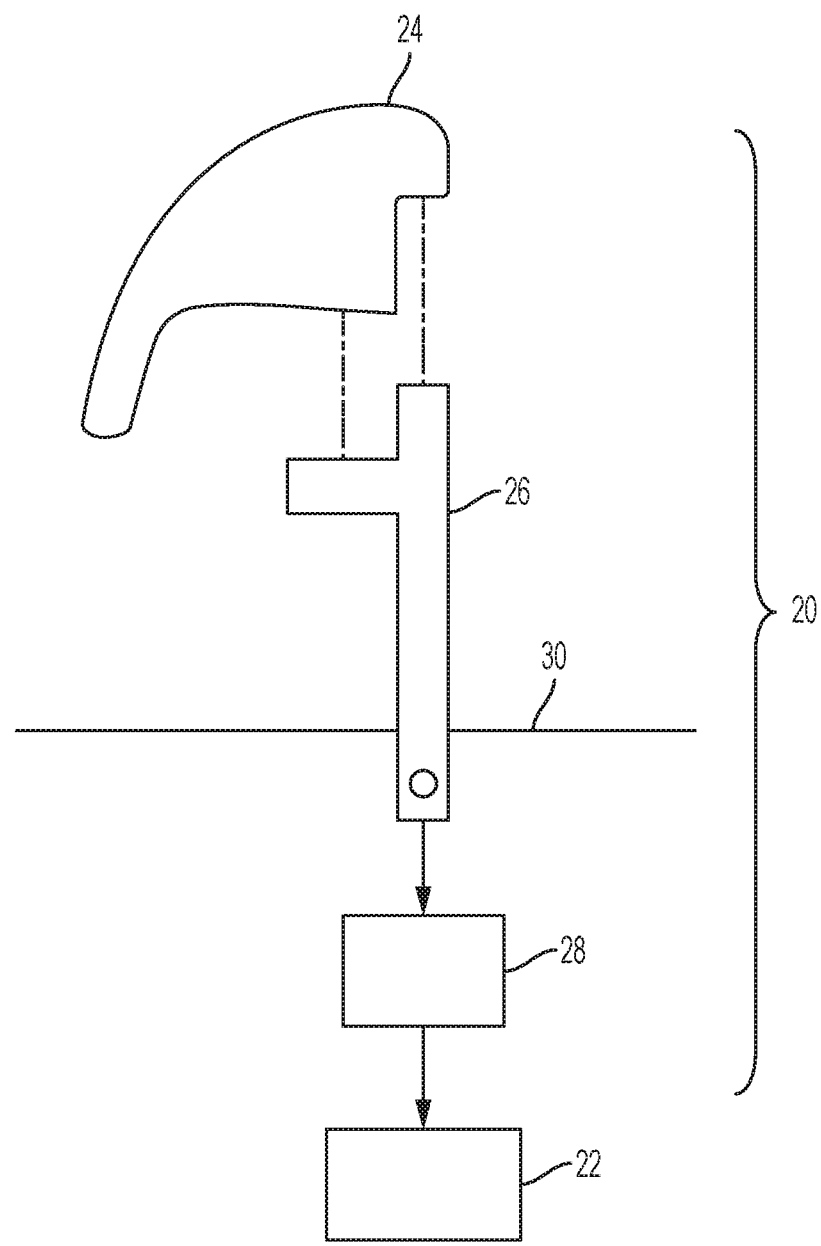
FIG. 1 is a schematic of a gear shift control system as one, non-limiting, exemplary embodiment of the present disclosure.

Referring to FIG. 1, a gear shift control system 20 as one, non-limiting embodiment of the present disclosure is illustrated and connected to a transmission 22 of a vehicle powertrain. The gear shift control system 20 may include a gear shift module 24, a lever or substructure 26 (i.e., armature), and a control device 28. In one embodiment, the gear shift module 24 may be a preassembled, modular component of the gear shift control system 20. The gear shift module 24 is supported by, and fixed to, the lever 26, or a knob of the lever. The lever 26 may extend from the control device 28, through an interior console 30 of a vehicle, and to the gear shift module 24. In one embodiment, the lever 26 may be supported by, and/or generally pivotally connected to, the control device 28. The control device 28 is adapted to associate a position of the lever 26 to a desired transmission position and/or function (i.e., park, neutral, reverse, forward, etc.). In one embodiment, the control device 28 may be adapted to mechanically place the transmission 22 in the desired shift position. In another embodiment, the control device 28 may be part of a shift-by-wire system. It is further contemplated and understood that the gear shift module 24 may be fixed to the knob of the lever, and/or may be a portion of the knob attachable or integrated to the lever 26.

Figure 2:
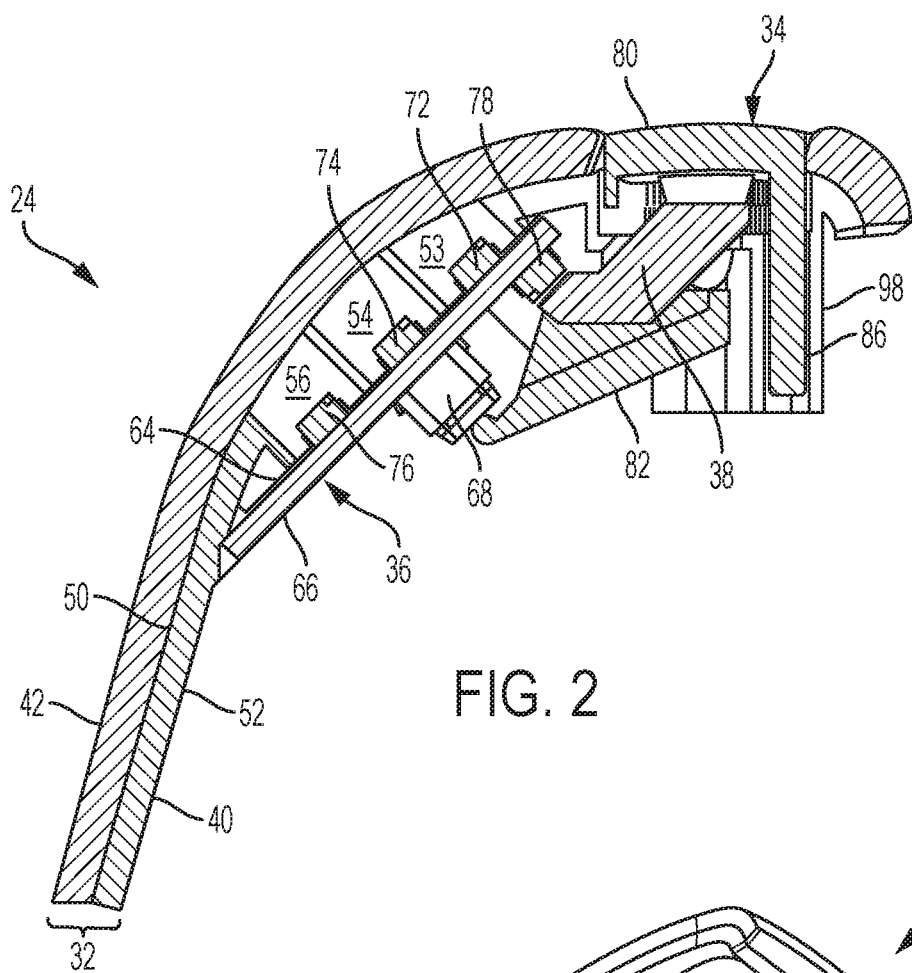
FIG. 2 is a cross section of a gear shift module of the gear shift control system.
Figure 3:
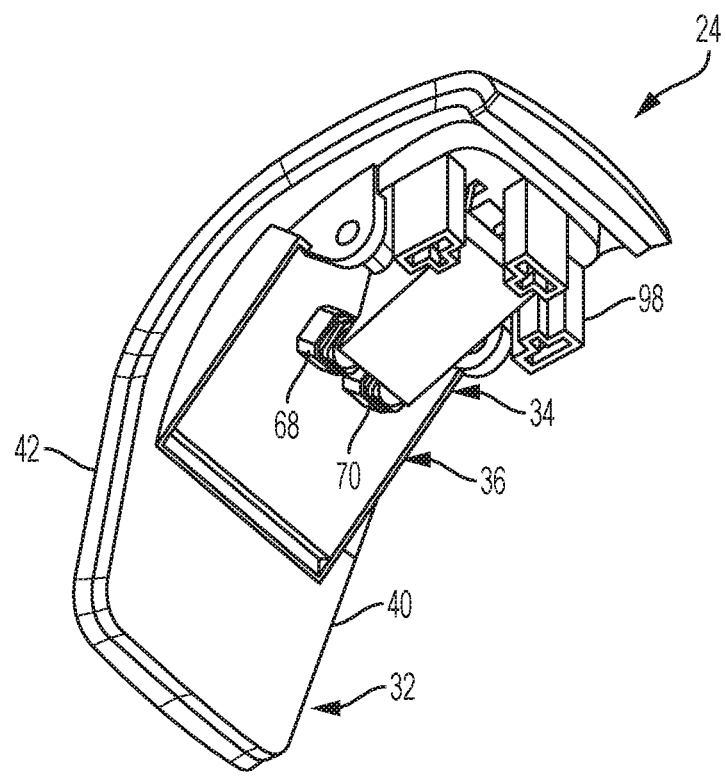
FIG. 3 is an under perspective view of the gear shift module.
Figure 4:
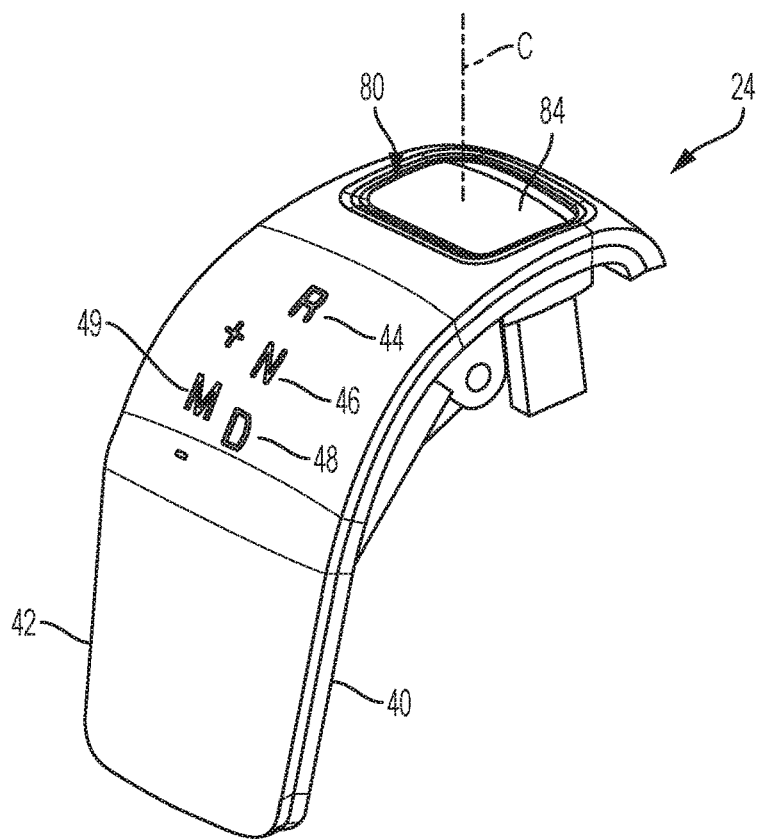
FIG. 4 is an outer perspective view of the gear shift module.
Figure 7:
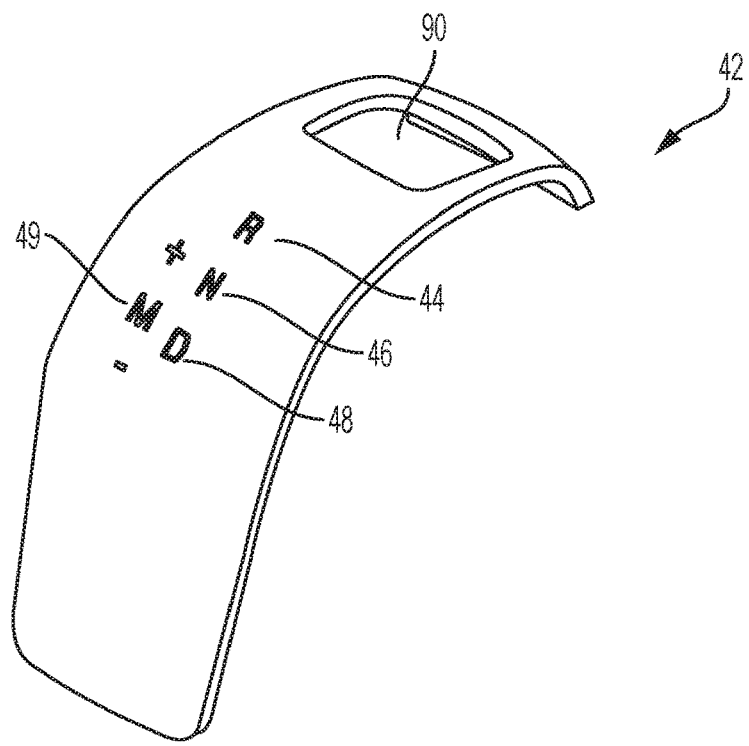
FIG. 7 is an outer perspective view of a cover of the gear shift module.

Referring to FIGS. 2-4, the gear shift module 24 functions as an user interface between a vehicle operator and the transmission 22. The gear shift module 24 may include a cover assembly 32, an actuator assembly 34, a circuit board 36 (e.g., printed circuit board, PCB), and a light guide 38. The cover assembly 32 may include an undercover 40 (also see FIG. 5), and a cover 42 (also see FIG. 7). The undercover 40 generally functions as a substructure and may be substantially hidden from the view of the vehicle operator. The cover 42 covers, is connected to, and is supported by, the undercover 40. As best shown in FIGS. 4 and 7, the cover 42 may include various visual features (44, 46, 48) that may be continuously or selectively illuminated. Feature 44 may be an "R" signifying the transmission in reverse, feature 46 may be an "N" signifying the transmission in neutral, and feature 48 may be a "D" signifying the transmission in drive. Yet further, another visual feature 49 may include the figure "M" signifying the ability to shift transmission gears one-by-one. It is contemplated and understood that the undercover 40 and the cover 42 may be manufactured as two separate, attachable pieces, or may be manufactured as a single piece in, for example, a plastic single injection or bi-injection manufacturing process (i.e., molded).

Figure 5:
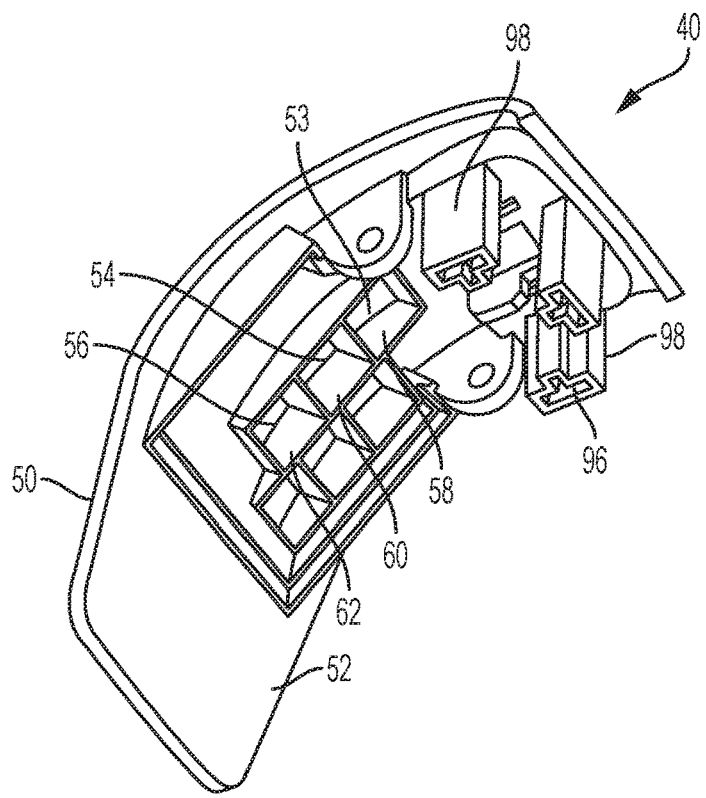
FIG. 5 is an under perspective view of an undercover of the gear shift module.

Referring to FIG. 5, the undercover 40 of the cover assembly 32 may include a first side 50 (e.g., external or top side) and an opposite side 52 (e.g., under side). The first side 50 substantially faces, and may be in contact with, the cover 42. The undercover 40 may further include a plurality of openings (i.e., three identified as 53, 54, 56) defined by a plurality of respective conduits 58, 60, 62 each projecting outward from the opposite side 52. Each conduit 58, 60, 62 may be constructed to channel light rays to the respective features 44, 46, 48 of the cover 42. In one embodiment, the conduits 58, 60, 62 function to prevent light rays intended to illuminate one feature from also, at least partially, illuminating an adjacent feature.

Figure 10:
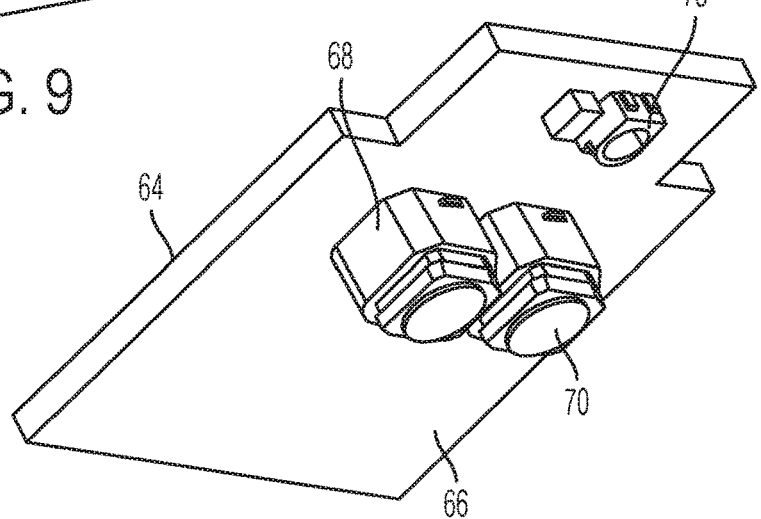
FIG. 10 is an under perspective view of a printed circuit board of the gear shift module.

Referring to FIGS. 2, 3, and 10, the circuit board 36 may be attached (e.g., snap fitted, adhered, or otherwise fastened) to the undercover 40 of the cover assembly 32. The circuit board 36 may include a face 64, an opposite face 66 (i.e., faces in an opposite direction from the face 64), at least one electrical switch (i.e., two illustrated as 68, 70 for operational redundancy), and a multitude of light sources (i.e., four illustrated as 72, 74, 76, 78) that may, for example, be Light Emitting Diodes (LEDs). The light sources 72, 74, 76 may be mounted to the face 64, and the light source 78 and the switches 68, 70 may mounted to the opposite face 66. In another example, all the light sources 72, 74, 76, 78 may be mounted to the face 64, but the light sources 72, 74, 76 may substantially emit light in a common, first direction, and the light source 78 may emit light in a different direction.

When the gear shift module 24 is fully assembled, the light sources 72, 74, 76 may be located in the respective openings 53, 54, 56, and generally shrouded by the respective conduits 58, 60, 62 of the undercover 40. In one embodiment, distal ends of the conduits 58, 60, 62 are in contact with, or proximate to, the face 64 of the circuit board 36. The switches 68, 70 are in operational contact with the actuator assembly 34, and the light source 78 is positioned to output light rays into the light guide 38.

Figure 6:
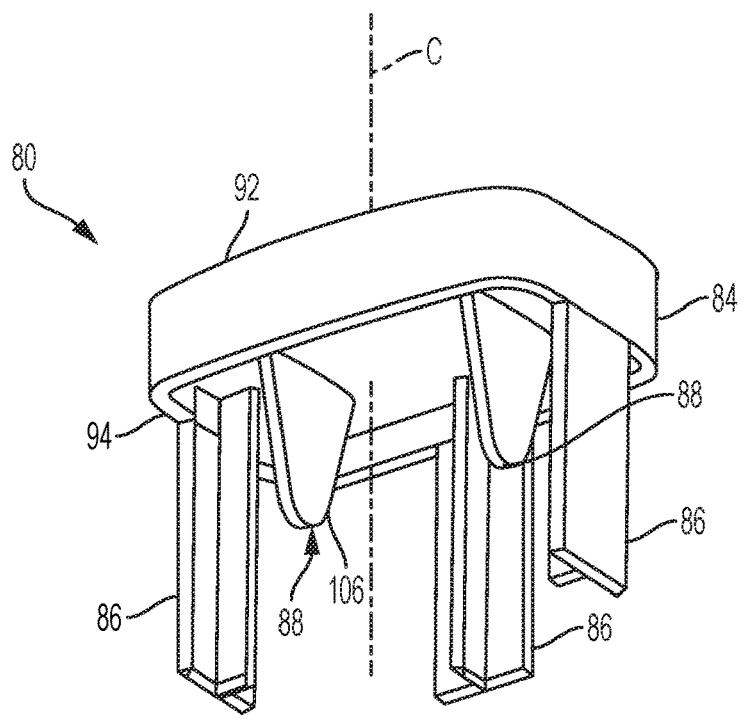
FIG. 6 is an under perspective view of a push button of the gear shift module.

Referring to FIGS. 2 and 4, the actuator assembly 34 is adapted to be actuated by the operator of the vehicle. Once actuated, the operator may then change transmission positions by, for example, grasping the gear shift module 24 and moving or pivoting the lever 26 of the gear shift control system 20, or may directly change transmission positions from one to another position, or to a specific position (e.g., drive "D" to park "P"). The actuator assembly 34 may include a button 80 (e.g., push button, also see FIG. 6), and a linkage 82 (also see FIG. 8). The button 80 may include a pad 84, at least one elongated guide 86 (i.e., three illustrated), and at least one stanchion 88 (i.e., two illustrated). The pad 84 may be located in an opening 90 (see FIG. 7) defined by boundaries of the cover 42, and may include an external surface 92 exposed through the cover 42, and an internal surface 94 orientated opposite to the external surface 92. It is contemplated and understood that the button 80 may be any button configured to perform any variety of functions (i.e., a function button). In the embodiment illustrated, the button 80 is a shift button. The button 80 may be a single piece, and may be made of plastic (e.g., injection molded plastic). Similarly, the linkage 82 may be a single, unitary piece, and may be made of plastic (e.g., injection molded plastic).

The function button 80 may function to place the vehicle in park (i.e., "P" position), or may function to release or enable shifting of the transmission. In yet another embodiment, the gear shift module 24 may include both a park button and a shift button that may generally operate off of the single circuit board 36.

In operation, the function button 80 is adapted to be depressed by the operator of the vehicle to perform the function. For example, the function button 80 may be a park button and is depressed to enable placing the vehicle from drive "D" to park "P". Actuation of the button 80 moves along a substantially linear centerline C (see FIGS. 4, 6 and 11), and between an un-pressed position and a pressed position. The stanchions 88 of the button 80 project longitudinally outward from the internal surface 94, through the undercover 40, and are substantially parallel to the centerline C. Similarly, the guides 86 project longitudinally outward from the internal surface 94, through the undercover 40, and are substantially parallel to the centerline C.

The guides 86 of the button 80 are received in respective channels 96 that may be defined by boundaries carried by respective legs 98 of the undercover 40, which project outward from the opposite side 52 (i.e., underside) of the undercover 40 (see FIG. 5). In this way, the undercover 40 provides smooth, linear actuation of the button 80 between the pressed and depressed positions.

Figure 8:
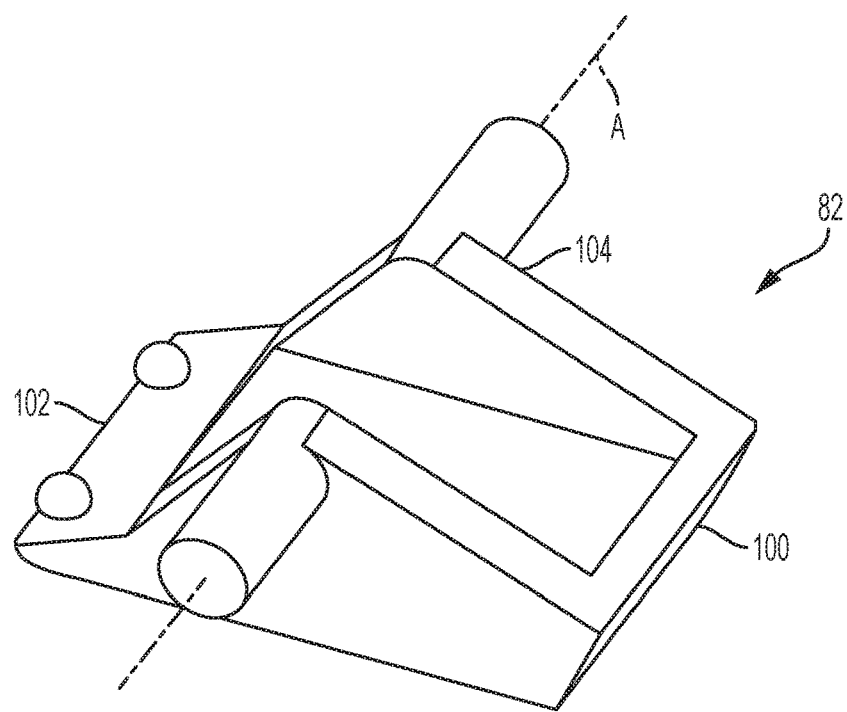
FIG. 8 is a perspective view of a lever of the gear shift module.
Figure 11:
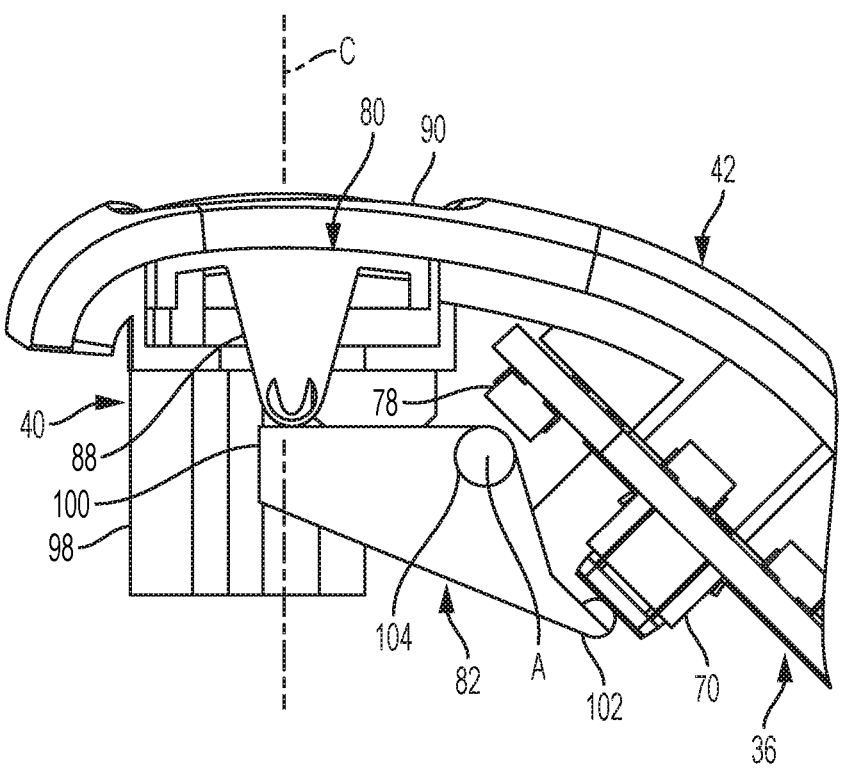
FIG. 11 is a partial cross section of the gear shift module illustrating the push button of the actuator assembly.
Figure 12:
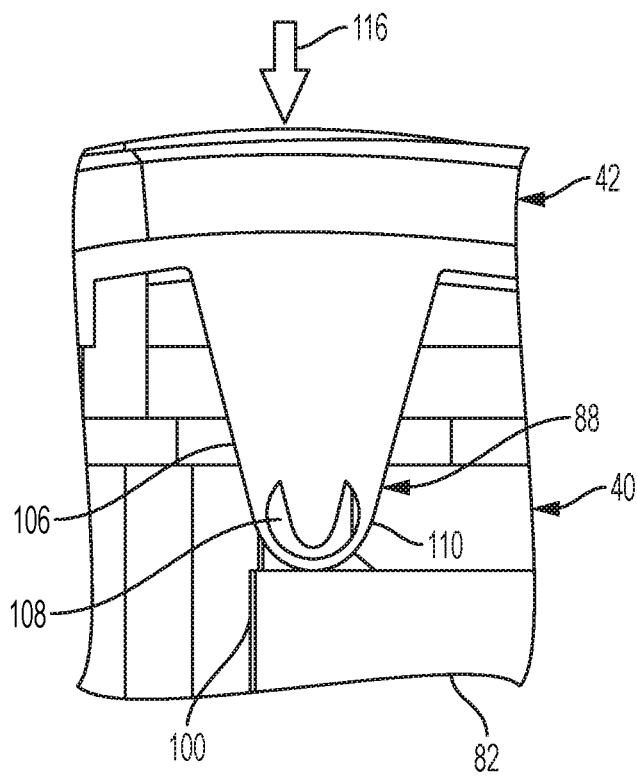
FIG. 12 is an enlarged cross section of the actuator assembly illustrating a distal end portion of the push button.

Referring to FIGS. 8, 11 and 12, the linkage 82 of the actuator assembly 34 is generally constructed to link the button 80 with the electrical switches 68, 70, such that when the button 80 is moved along the centerline C, the button 80 bears upon the linkage 82, causing the linkage 82 to actuate the switches 68, 70. In one example, the linkage 82 may be a pivotal linkage, and may include an end portion 100, an end portion 102 orientated opposite end portion 100, and a mid-portion 104 generally located between the end portions 100, 102. The mid-portion 104 may be pivotally engaged to the undercover 40 and about an axis A. The end portion 100 is in contact with a distal end portion 106 of the stanchions 88 of the button 80, and the end portion 102 is in contact with the switches 68, 70. The axis A may be spaced radially outward from, and may be substantially normal to, the centerline C.

The distal end portion 106 of the each stanchion 88 may include a resiliently flexible member 110 for taking-up slack in the actuator assembly 34 (i.e., alleviating any lost motion), and an index 108 that is generally less resilient than the flexible member 110 and is opposed to the end portion 100. At least a portion of the resiliently flexible member 110 is spaced axially in front of the index 108 and with respect to the centerline C, and is in direct, biased contact with the end portion 100 of the linkage 82.

Figure 13:
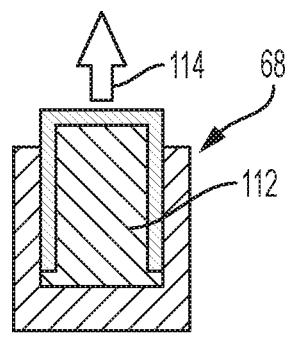
FIG. 13 is a cross section of an electric switch of the printed circuit board.

In operation of the actuator assembly 34, and when the button 80 is in the un-pressed position, a biasing member 112 (e.g., coiled spring, see FIG. 13) of each electrical switch 68, 70 may create a force (see arrow 114 in FIG. 13) that is transmitted through the linkage 82 and against the resiliently flexible member 110 of the push button 80, thereby biasing the push button 80 in, or toward, the un-pressed position. When the operator of the vehicle depresses the button 80, a force (see arrow 116 in FIG. 12) is applied to the pad 84 of the button 80 that exceeds the reactive force of the biasing member 112 of the switches 68, 70. During this actuation, the resiliently flexible member 110 may be displaced axially by a pre-determined distance that may be less than, or equal to, the axial spacing between the index 108 and the resiliently flexible member 110. That is, in order to remove free-play, this flexible geometry is interference fitted against the linkage 82 during assembly. The compression effort is low enough to reduce the free play without modifying the initial peak effort of the switches 68, 70. In one example, the force needed to fully flex the resiliently flexible member 110 is lower than the force exerted by the switches 68, 70 generally when the button 80 is being pressed.

Figure 14:
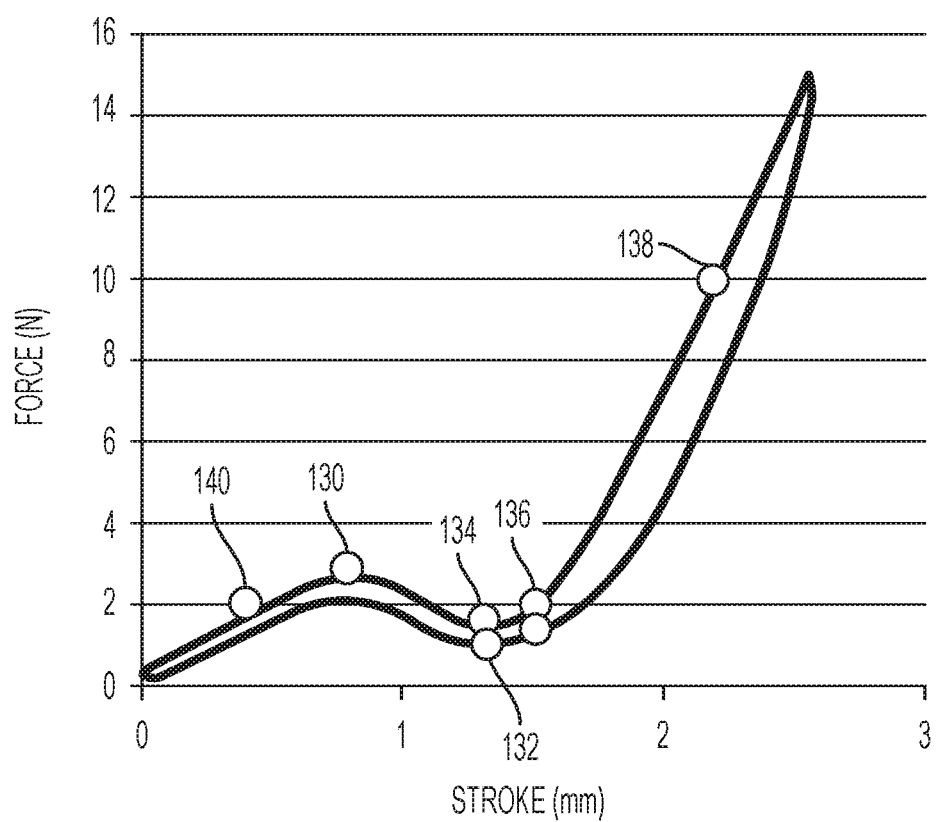
FIG. 14 is a graph illustrating force versus axial displacement of the button.

Referring to FIG. 14, a graph depicts the dynamics of the actuator assembly 34 having an X-axis depicting axial displacement along the centerline C, and a Y-axis depicting the applied force 116. Point 130 is associated with the maximum effort to generally activate the button 80 at about 3.2 N as one example. Point 132 is associated with the return effort (i.e., the force 114 from the switch) at about greater than 0.3 N as one example. Point 134 is associated with the swallowing effort at about 1.8 N as one example. Point 136 is associated with the axial stroke along the centerline C to activate the button 80 at about 1.4 mm as one example. Point 138 is the stroke of the button 80 under about 10 N and about 2 mm as one example. Point 140 is the maximum stroke under 2 N and about 0.4 mm as one example.

Figure 9:
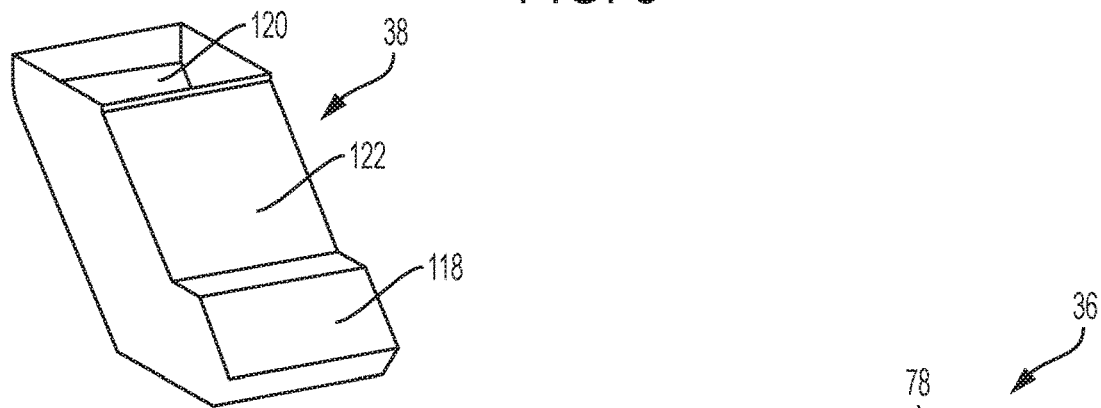
FIG. 9 is a perspective view of a light guide of the gear shift module.

Referring to FIGS. 2 and 9, the light guide 38 is adapted to receive light rays from the light source 78 at an inlet face 118, transmit the light internally, and expel the light rays at an outlet face 120 that generally opposes the pad 84 of the button 80. In one embodiment, the light guide 38 may be supported by, or fixed to, the undercover 40. At least a portion of the pad 84 may be at least partially translucent to permit the illumination of the pad 84 via the light rays outputted by the light guide 38. An imaginary plane of the inlet face 118 may traverse an imaginary plane of the outlet face 120. At least one side of the light guide 38 may include a reflector 122 (i.e., reflective surface, coating, etc.) to optimize the transmission of the light rays between the faces.

In one embodiment, the pad 84 of the button 80 may be continuously illuminated. In another embodiment, the light source 78 may energize upon, or in relation with, the actuation of the switches 68, 70, or vice versa.

Benefits and advantages of the present disclosure include an integrated cover and undercover with an actuator assembly, PCB, and light guide all as one modular assembly. Other advantages include improvements in illumination alignment, transmission efficiency, and a reduction in actuator assembly free play. Further advantages include cost reductions attributable, in-part, via the use of a single PCB and a reduction in wiring, tolerance stack up simplification establishing better constant gap between the button and the cover, and simplification in assembly.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A preassembled gear shift module adapted to connect to a substructure, the preassembled gear shift module comprising:
   a cover assembly;
   a circuit board attached to the cover assembly, and including a switch directly attached to and on the circuit board;
   a function button exposed through the cover assembly, the function button being operably connected to the switch; and
   a linkage pivotally connected to the cover assembly, and extending between and in contact with the function button and the switch.

2. The preassembled gear shift module set forth in claim 1, wherein the function button is adapted to move linearly between an un-pressed position and a pressed position.

3. The preassembled gear shift module set forth in claim 2, wherein the function button is a shift button.

4. The preassembled gear shift module set forth in claim 2, wherein the switch includes a biasing member adapted to transmit a force through the linkage and upon the function button to bias the function button toward the un-pressed position.

5. The preassembled gear shift module set forth in claim 1, wherein the circuit board includes a plurality of light sources adapted to illuminate through the cover assembly, and wherein the plurality of light sources are directly mounted upon the circuit board.

6. A preassembled gear shift module adapted to connect to a substructure, the preassembled gear shift module comprising:
   a cover assembly;
   a circuit board attached to the cover assembly, and including a switch directly attached to and on the circuit board; and
   a function button exposed through the cover assembly, the function button being operably connected to the switch; and
   a light guide supported by an undercover of the cover assembly and adapted to channel light from a first light source of the circuit board and through the function button, the light guide including an inlet face adapted to receive light rays from at least one of the plurality of light sources and an outlet face opposing a pad of the button and adapted to expel the light rays, and wherein at least a portion of the pad is translucent and the light guide is constructed to internally transmit the light rays between the inlet and outlet faces.

7. The preassembled gear shift module set forth in claim 6, wherein the circuit board includes a second light source adapted to project light through the cover assembly to illuminate an external visual feature on the cover assembly.

8. A preassembled gear shift module adapted to connect to a substructure, the preassembled gear shift module comprising:
   a cover assembly;
   a circuit board attached to the cover assembly, and including a switch;
   a function button exposed through the cover assembly, the function button being operably connected to the switch; and
   a light guide supported by an undercover of the cover assembly and adapted to channel light from a first light source of the circuit board and through the function button, wherein the circuit board includes a second light source adapted to project light through the cover assembly to illuminate an external visual feature on the cover assembly, and wherein the circuit board includes a first face and an opposite second face, the first light source and the switch being mounted on the first face, and the second light source being mounted on the second face.

9. The preassembled gear shift module set forth in claim 8, wherein the cover assembly defines an opening for receipt and exposure of the function button.

10. A preassembled gear shift module adapted to connect to a substructure, the preassembled gear shift module comprising:
   a cover assembly;
   a circuit board attached to the cover assembly, and including a switch;
   a function button exposed through the cover assembly, the function button being operably connected to the switch; and
   a linkage including a first end portion, an opposite second end portion, and a mid-portion disposed between the first and second end portions, the first end portion being in contact with the function button, the second end portion being in contact with the switch, and the mid portion being pivotally connected to the cover assembly.

* * * * *